(12) United States Patent
Fujiwara

(10) Patent No.: US 12,052,553 B2
(45) Date of Patent: Jul. 30, 2024

(54) SOUND OUTPUT DEVICE, SOUND OUTPUT SYSTEM, AND CONTROL METHOD

(71) Applicant: SEIKO EPSON CORPORATION, Tokyo (JP)

(72) Inventor: Takehiro Fujiwara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1 day.

(21) Appl. No.: 17/709,344

(22) Filed: Mar. 30, 2022

(65) Prior Publication Data

US 2022/0322007 A1    Oct. 6, 2022

(30) Foreign Application Priority Data

Mar. 31, 2021  (JP) ................................ 2021-059779

(51) Int. Cl.
  *H04R 1/10* (2006.01)
  *G02B 27/01* (2006.01)
  *H04R 3/12* (2006.01)

(52) U.S. Cl.
  CPC ............ *H04R 3/12* (2013.01); *G02B 27/017* (2013.01); *H04R 1/1041* (2013.01); *H04R 1/105* (2013.01)

(58) Field of Classification Search
  CPC ......... H04R 3/12; H04R 1/1041; H04R 1/105
  USPC ............................ 381/77–79, 123, 74, 81, 85
  See application file for complete search history.

(56) References Cited

U.S. PATENT DOCUMENTS

| | | | |
|---|---|---|---|
| 7,013,012 B2* | 3/2006 | Lo ............................. | H04S 3/00 381/306 |
| 9,788,096 B2* | 10/2017 | Zhang ...................... | H04R 5/04 |
| 9,924,270 B2* | 3/2018 | Shanmugam ............ | H04R 5/04 |
| 10,187,726 B2* | 1/2019 | Chang ...................... | H04R 5/04 |
| 10,551,050 B1* | 2/2020 | Park ...................... | G06T 19/006 |
| 11,184,721 B2* | 11/2021 | Millington ......... | H04N 21/4396 |
| 2006/0165244 A1* | 7/2006 | Wu .......................... | H04R 5/04 381/77 |
| 2016/0029136 A1* | 1/2016 | Kelloniemi ............ | H04R 27/00 381/77 |
| 2016/0205459 A1* | 7/2016 | Kamada ................ | H04R 1/1041 381/74 |

FOREIGN PATENT DOCUMENTS

JP      2009-009321      1/2009

* cited by examiner

*Primary Examiner* — Disler Paul
(74) *Attorney, Agent, or Firm* — JCIPRNET

(57) ABSTRACT

Provided is a sound output device communicatively coupled to an information processing device, that includes a mounting portion configured to mount the sound output device on a human body, a plurality of sound output units configured to perform operation for outputting information indicating sound, or sound, and a control unit configured to, when the sound output device is coupled to the information processing device, enable operation of one or more first sound output units that are predetermined among the plurality of sound output units, and disable operation of one or more sound output units other than the one or more first sound output units among the plurality of sound output units.

8 Claims, 7 Drawing Sheets

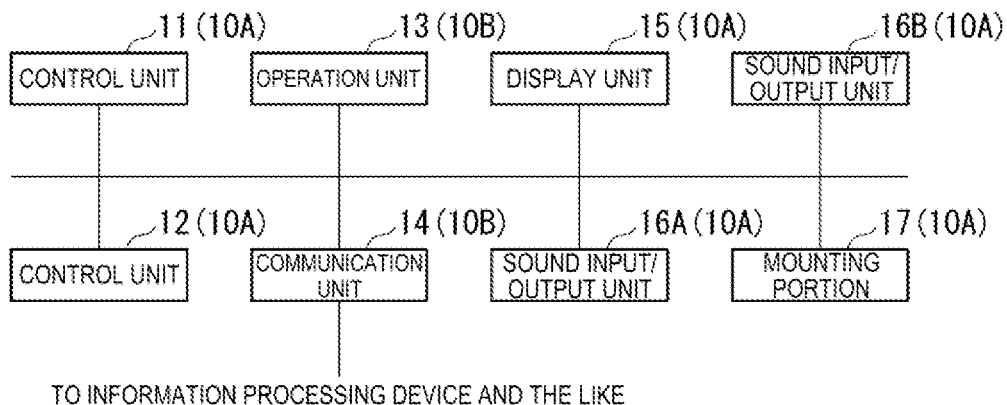

FIG. 2

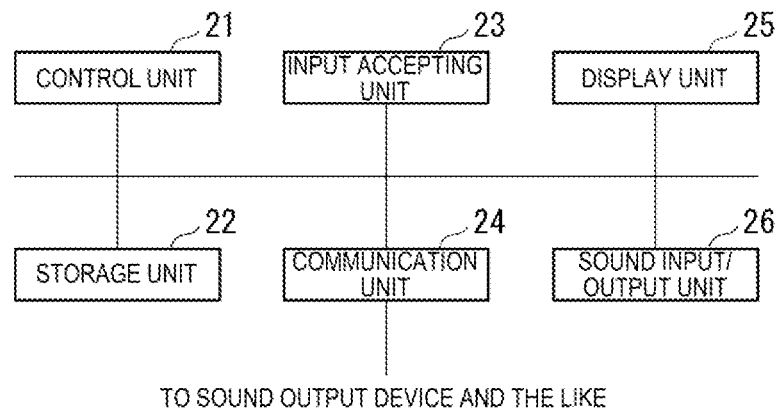

FIG. 3

| | SOUND INPUT/ OUTPUT UNIT 16A | SOUND INPUT/ OUTPUT UNIT 16B | PRESENCE/ABSENCE OF PLUGGING INTO SOUND INPUT/OUTPUT UNIT 16B | SOUND INPUT/ OUTPUT UNIT FOR OUTPUTTING SOUND |
|---|---|---|---|---|
| Case1 | Enable | Enable | CONNECT | NOT DEFINED |
| Case2 | | | DISCONNECT | SOUND INPUT/ OUTPUT UNIT 16A |
| Case3 | Enable | Disable | CONNECT | SOUND INPUT/ OUTPUT UNIT 16A |
| Case4 | | | DISCONNECT | SOUND INPUT/ OUTPUT UNIT 16A |
| Case5 | Disable | Enable | CONNECT | SOUND INPUT/ OUTPUT UNIT 16B |
| Case6 | | | DISCONNECT | SOUND INPUT/ OUTPUT UNIT 26 |
| Case7 | Disable | Disable | CONNECT | SOUND INPUT/ OUTPUT UNIT 26 |
| Case8 | | | DISCONNECT | SOUND INPUT/ OUTPUT UNIT 26 |

FIG. 4

Case3

| SOUND INPUT/ OUTPUT UNIT 16A | SOUND INPUT/ OUTPUT UNIT 16B | PRESENCE/ABSENCE OF PLUGGING INTO SOUND INPUT/OUTPUT UNIT 16B | SOUND INPUT/ OUTPUT UNIT FOR OUTPUTTING SOUND |
|---|---|---|---|
| Enable | Disable | CONNECT | SOUND INPUT/ OUTPUT UNIT 16A |

Case7

| SOUND INPUT/ OUTPUT UNIT 16A | SOUND INPUT/ OUTPUT UNIT 16B | PRESENCE/ABSENCE OF PLUGGING INTO SOUND INPUT/OUTPUT UNIT 16B | SOUND INPUT/ OUTPUT UNIT FOR OUTPUTTING SOUND |
|---|---|---|---|
| Disable | Disable | CONNECT | SOUND INPUT/ OUTPUT UNIT 26 |

Case5

| SOUND INPUT/ OUTPUT UNIT 16A | SOUND INPUT/ OUTPUT UNIT 16B | PRESENCE/ABSENCE OF PLUGGING INTO SOUND INPUT/OUTPUT UNIT 16B | SOUND INPUT/ OUTPUT UNIT FOR OUTPUTTING SOUND |
|---|---|---|---|
| Disable | Enable | CONNECT | SOUND INPUT/ OUTPUT UNIT 16B |

FIG. 6

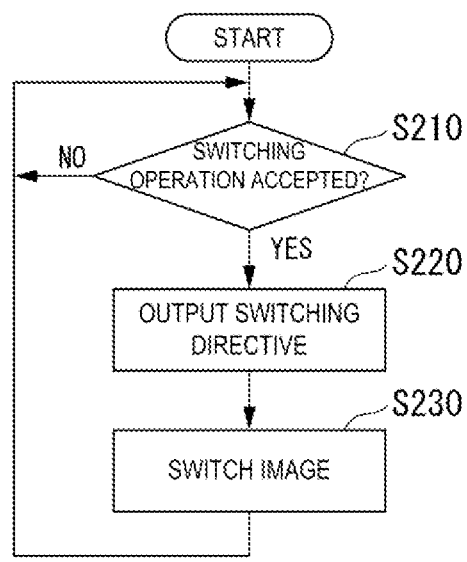

FIG. 7

SOUND OUTPUT DEVICE, SOUND OUTPUT SYSTEM, AND CONTROL METHOD

The present application is based on, and claims priority from JP Application Serial Number 2021-059779, filed Mar. 31, 2021, the disclosure of which is hereby incorporated by reference herein in its entirety.

BACKGROUND

1. Technical Field

The disclosure relates to a sound output device, a sound output system, and a control method.

2. Related Art

Research and development of devices that output sound have been conducted.

In this regard, an information processing device that displays an image and outputs sound for a plurality of display devices has been known, wherein information that associates an image display destination with a sound output destination is stored, and when the image display destination is switched, based on this information, a sound output destination associated with an image display destination after the image display destination is switched is set as a sound output destination after the image display destination is switched (see JP 2009-009321 A).

Here, in the information processing device such as that described in JP 2009-009321 A, when a display device selected as a sound output destination includes a plurality of sound output devices serving as sound output destinations, a determination of which sound output device is to be selected as a sound output destination could not be made, and sound was output from an unintended sound output device in some cases. In other words, when a display device coupled to the information processing device is provided with a plurality of sound output devices, the display device outputs sound from an unintended sound output device when coupled to the information processing device in some cases.

SUMMARY

In order to solve the above-described problem, an aspect of the present disclosure is a sound output device coupled to an information processing device, that includes a display unit including a display element for emitting imaging light, a mounting portion configured to mount the display unit on a human body, a first sound output unit configured to output sound or information indicating the sound, a second sound output unit different from the first sound output unit and configured to output the sound or the information indicating the sound, and a control unit configured to, when the sound output device is coupled to the information processing device, enable operation of the first sound output unit, and disable operation of the second sound output unit.

In addition, in order to solve the above-described problem, an aspect of the present disclosure is a sound output system that includes the sound output device described above, and the information processing device.

In addition, in order to solve the above-described problem, an aspect of the present disclosure is a control method of a sound output device communicatively coupled to an information processing device, the sound output device including a mounting portion mounting the sound output device on a human body, and a plurality of sound output units performing operation of outputting information indicating sound, or sound, the control method including, when the sound output device is coupled to the information processing device, enabling operation of one or more first sound output units that are predetermined among the plurality of sound output units, and when the sound output device is coupled to the information processing device, disabling operation of one or more of the sound output units other than the one or more first sound output units among the plurality of sound output units.

BRIEF DESCRIPTION OF THE DRAWINGS

FIG. 2 is a diagram illustrating an example of a configuration of a sound output device 10 included in the sound output system 1.

FIG. 3 is a diagram illustrating an example of a configuration of an information processing device 20 included in the sound output system 1.

FIG. 4 is a diagram illustrating an example of a relationship between enabling or disabling operation of each of a sound input/output unit 16A and a sound input/output unit 16B, and the sound input/output unit that outputs sound in the sound output system 1.

FIG. 6 is a diagram illustrating an example of an image of states to transition through the processing in step S170.

FIG. 7 is a diagram illustrating an example of a flow of processing performed by the information processing device 20 when a switching operation is accepted.

DESCRIPTION OF EXEMPLARY EMBODIMENTS

Exemplary Embodiments

Exemplary embodiments of the present disclosure will be described below with reference to the accompanying drawings.

Overview of Sound Output System

First, an overview of a sound output system according to an exemplary embodiment will be described.

The sound output system according to the exemplary embodiment includes a sound output device and an information processing device. Here, the sound output device is communicatively coupled to the information processing device. Further, the sound output device includes a mounting portion, a plurality of sound output units, and a control unit. The mounting portion mounts the sound output device on a human body. Each of the plurality of sound output units performs operation of outputting information indicating sound, or sound. Then, when the sound output device is coupled to the information processing device, the control unit enables operation of one or more first sound output units that are predetermined among the plurality of sound output units, and disables operation of one or more of the sound output units other than the one or more first sound output units among the plurality of sound output units. Thus, the sound output device and the sound output system, when coupled to the information processing device, can prevent sound from being output from an unintended sound output unit.

The following is a detailed description of a configuration of the sound output system according to the exemplary embodiment, and processing performed by the sound output system when the sound output device is coupled to the information processing device.

Configuration of Sound Output System

First, the configuration of the sound output system according to the exemplary embodiment will be described using the sound output system 1 as an example. Note that, hereinafter, for convenience of explanation, a user of the sound output system 1 will be described simply as a user.

Figure 1:
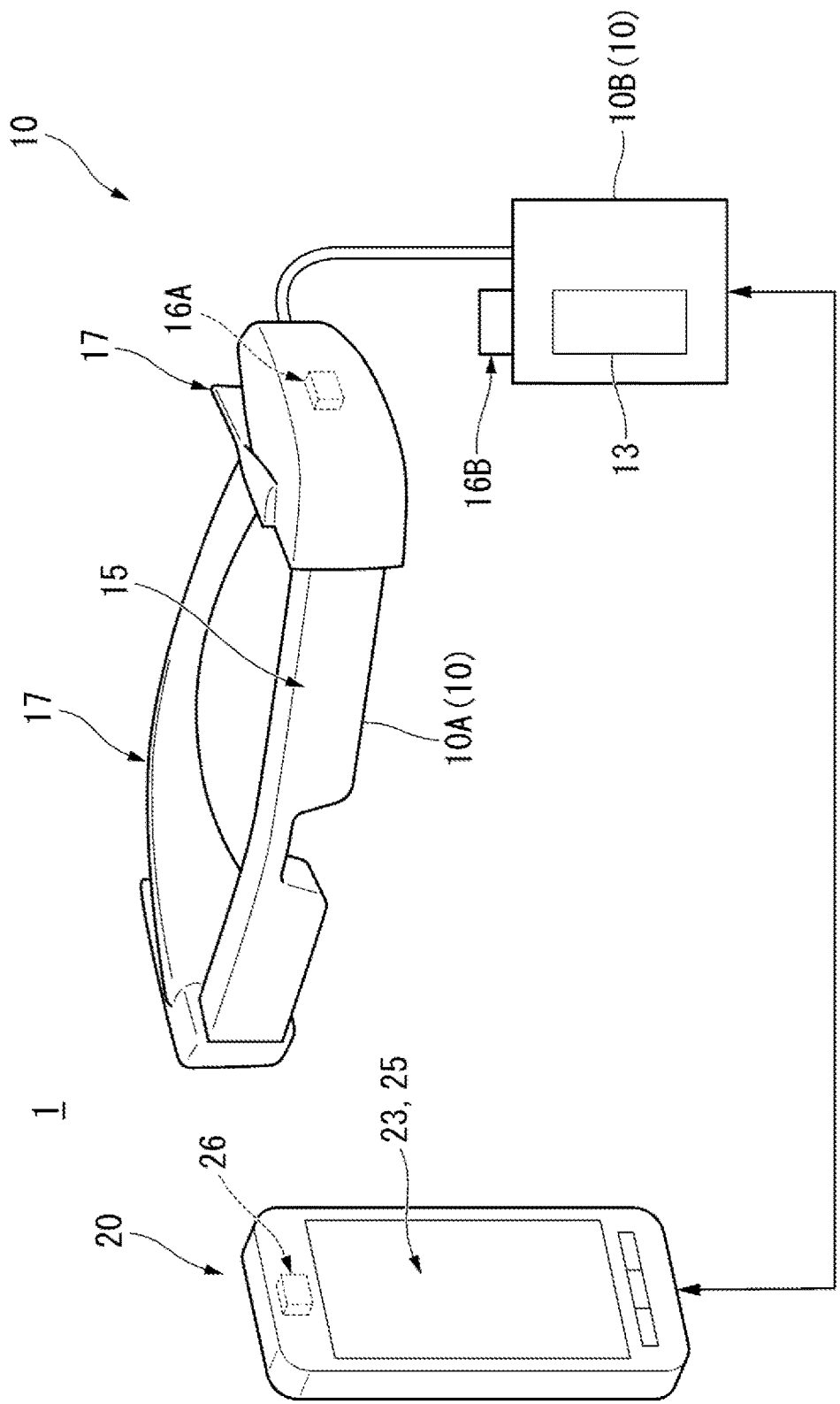
FIG. 1 is a schematic diagram illustrating an example of a configuration of a sound output system 1.

FIG. 1 is a schematic diagram illustrating an example of a configuration of the sound output system 1. Further, FIG. 2 is a diagram illustrating an example of a configuration of the sound output device 10 included in the sound output system 1. Further, FIG. 3 is a diagram illustrating an example of a configuration of the information processing device 20 included in the sound output system 1.

The sound output system 1 includes the sound output device 10, and the information processing device 20. Here, the sound output device 10 and the information processing device 20 are communicably coupled to each other via wire or wirelessly.

The sound output system 1 causes the information processing device 20 to output sound information indicating sound, and causes the sound output device 10 to output the sound indicated by the sound information output from the information processing device 20. Thus, the sound output system 1 can cause the user to listen to a sound that the user desires. Here, in the present exemplary embodiment, the sound refers to audio, acoustics, music, or the like, but is not limited thereto. That is, in the present exemplary embodiment, the sound may be a sound that living matter makes, or may be a sound that inanimate matter makes. Additionally, in the present exemplary embodiment, the sound information may be a signal indicating sound, or may be other types of information indicating sound.

The sound output device 10 is an example of the sound output device described above. The sound output device 10 acquires the sound information output from the information processing device 20. The sound output device 10 performs processing in accordance with the acquired sound information. For example, the sound output device 10 performs processing for outputting sound indicated by the acquired sound information. Thus, the sound output device 10 can cause the user to listen to the sound. Further, for example, the sound output device 10 performs processing for outputting the acquired sound information to another device capable of outputting the sound indicated by the sound information. The other device is, but not limited to, an earphone, a headphone, or the like. As a result, the sound output device 10 can cause the other device to output the sound indicated by the sound information output from the information processing device 20.

Further, the sound output device 10 is a device that can be mounted to the user. In the example illustrated in FIG. 1, the sound output device 10 is a head-mounted display. The head-mounted display is an example of a wearable display device. Note that, the sound output device 10 may be another type of wearable display device that can be mounted to the user, instead of a head-mounted display. Further, the sound output device 10 may be a wearable device not capable of displaying an image, and capable of outputting sound, instead of a head-mounted display. Examples of the device include a headphone, and the like.

Further, the sound output device 10 includes a plurality of sound output units that perform operation of outputting sound information or sound. Thus, the sound output device 10 can cause any one of the plurality of sound output units to output sound indicated by the sound information acquired from the information processing device 20, or the sound information itself. Each of these plurality of sound output units is, for example, a cone type speaker, a horn type speaker, a ribbon type speaker, a dome type speaker, or a bone conductive speaker, a device having a jack from which sound information is output, a device having a plug from which sound information is output, a communication device that wirelessly outputs sound information, or the like, but is not limited thereto. Note that, some or all of the plurality of sound output units included in the sound output device 10 may each be a sound input/output unit configured integrally with a sound input unit into which sound information is input. In this case, the sound input/output unit is, for example, a device in which any one of various types of speakers and a microphone are configured integrally, a communication device that wirelessly inputs and outputs sound information, or the like, but not limited thereto. Hereinafter, as an example, a case in which the sound output device 10 includes two sound output units will be described. Further, hereinafter, as an example, a case will be described in which each of the two sound output units is a sound input/output unit. Further, hereinafter, as an example, a case will be described in which the two sound input/output units are two sound input/output units of a sound input/output unit 16A and a sound input/output unit 16B. Note that, the sound output device 10 may be configured to include three or more sound output units. In this case, some or all of these three or more sound output units may each be a sound input/output unit.

Here, as illustrated in FIG. 2, the sound output device 10 includes a control unit 11, a storage unit 12, an operation unit 13, a communication unit 14, a display unit 15, the sound input/output unit 16A, the sound input/output unit 16B, and a mounting portion 17. Note that, in FIG. 1, the control unit 11, the storage unit 12, and the communication unit 14 are omitted, to prevent the figure from becoming complicated.

The control unit 11 controls the entire sound output device 10. The control unit 11 is a processor, and is, for example, a microcomputer, a CPU (Central Processing Unit), a DSP (Digital Signal Processor), or the like. The control unit 11 executes various programs stored in the storage unit 12. Note that, the control unit 11 may be configured with a plurality of pieces of hardware, or may be configured with a single processor. Further, the control unit 11 may be hardware that is programmed to implement each function of the sound output device 10. In other words, the control unit 11 may have a configuration in which various programs stored in the storage unit 12 are mounted as hardware circuits. In this case, for example, the control unit 11 is configured with an ASIC (Application Specific Integrated Circuit), an FPGA (Field Programmable Gate Array), or the like.

The storage unit 12 includes, for example, an SSD (Solid State Drive), an EEPROM (Electrically Erasable Programmable Read-Only Memory), a ROM (Read-Only Memory), a RAM (Random Access Memory), and the like. Note that, the storage unit 12 may be an external type storage device coupled by a digital input/output port such as a USB (Universal Serial Bus), or the like, instead of a storage device built in the sound output device 10. The storage unit 12 stores various types of information, various programs, and the like to be processed by the sound output device 10. Note that, the storage unit 12 may be configured with a single storage device, or may be configured with a plurality of storage devices.

The operation unit 13 has one or more hardware keys that accept various operations. The operation unit 13 includes a hardware key for accepting an operation of adjusting loudness of sound output from the sound output device 10, that is, sound volume, a hardware key for accepting an operation of switching a power source of the sound output device 10 on and off, and the like. Note that, the operation unit 13 may be configured to include other hardware keys instead of these hardware keys, or in addition to these hardware keys. Further, the sound output device 10 may be configured not to include the operation unit 13. In this case, the sound output device 10 accepts an operation from an information processing device that is communicatively coupled to the sound output device 10. Here, the information processing device 20 is an example of such an information processing device. Note that, even when the sound output device 10 includes the operation unit 13, the sound output device 10 accepts an operation from an information processing device that is communicatively coupled to the sound output device 10.

The communication unit 14 is configured to include, for example, a digital input/output port such as a USB, an Ethernet port (registered trade mark), and the like.

The display unit 15 is a display device including a transmissive liquid crystal display. Note that, instead of a transmissive liquid crystal display, the display unit 15 may be configured to include a display element such as another transmissive display, a liquid crystal display panel emitting imaging light to a transmissive light-guiding optical system, and a light-guiding optical system, or an organic EL (ElectroLuminescence) display panel. Furthermore, the display unit 15 is not limited to a transmissive type that transmits outside light, and may be configured not to transmit but to shield outside light to cause the user to visually recognize only an image, or may be configured to superimpose an external image captured by a camera and an image so as to be visible to the user.

The sound input/output unit 16A is an example of a sound input/output unit in which a sound input unit into which sound information is input, and a sound output unit that performs operation of outputting sound information or sound are integrally configured. The sound input/output unit 16A includes, for example, a built-in microphone and speaker configured integrally with the sound output device 10. In this case, the microphone is an example of a sound input unit into which sound information is input. In addition, in this case, the speaker is an example of a sound output unit that performs operation of outputting sound. Note that, the speaker may be any type of speaker. Further, the sound output device 10 may be configured to include a built-in speaker configured integrally with the sound output device 10, as a sound output unit instead of the sound input/output unit 16A.

The sound input/output unit 16B is an example of a sound input/output unit in which a sound input unit into which sound information is input, and a sound output unit that performs operation of outputting sound information or sound are integrally configured. The sound input/output unit 16B is, for example, a device that has a jack, and when a plug is plugged into the jack, inputs and outputs sound information via the jack and the plug. The plug is, for example, a plug through which sound information is input into an earphone, a headphone, or the like, a plug through which sound information is output from a music player device such as a CD player, or the like, but is not limited thereto. Note that, the sound output device 10 may be configured to include a device that performs operation of outputting sound information to the plug in this case, as a sound output unit instead of the sound input/output unit 16B. An earphone, a headphone, or the like is an example of the device.

The mounting portion 17 is a member used to mount the sound output device 10 to the user's body. In the example illustrated in FIG. 1, the sound output device 10 is a head-mounted display, as described above. In this case, the mounting portion 17 mounts the sound output device 10 to the head of the user so that the user can visually recognize a display surface of the display unit 15. In the example, the mounting portion 17 is a temple. Note that, in addition to the temple, the mounting portion 17 may have a configuration including a pad, a tip, or the like. In addition, instead of the temple, the mounting portion 17 may be another member as long as the member is capable of mounting the sound output device 10 to the user's head so that the user can visually recognize the display surface of the display unit 15.

Here, in the example illustrated in FIG. 1, the sound output device 10 is configured with two devices of a sound output device main body 10A and a relay device 10B. In this case, the sound output device main body 10A and the relay device 10B are communicably coupled to each other via wire or wirelessly. In this example, the sound output device main body 10A and the relay device 10B are communicatively coupled by a cable. Furthermore, the relay device 10B relays transmission and reception of various types of information between the sound output device main body 10A and the information processing device 20. In other words, in the example, the relay device 10B and the information processing device 20 are communicably coupled to each other via wire or wirelessly. Thus, in the example illustrated in FIG. 1, the sound output device 10 and the information processing device 20 are communicatively coupled as described above.

In addition, in the example illustrated in FIG. 1, the sound output device main body 10A includes the control unit 11, the storage unit 12, the display unit 15, the sound input/output unit 16A, the sound input/output unit 16B, and the mounting portion 17. In addition, in the example, the relay device 10B includes the operation unit 13 and the communication unit 14. Note that, the sound output device main body 10A may have a configuration further including at least one of the operation unit 13 and the communication unit 14. Furthermore, the relay device 10B may be configured to further include some or all of the control unit 11, the storage unit 12, the sound input/output unit 16A, and the sound input/output unit 16B. Additionally, the sound output device 10 may be a device in which the sound output device main body 10A and the relay device 10B are integrally formed.

The information processing device 20 is, for example, a multi-functional cellular phone terminal (smart phone). Note that, the information processing device 20 may be another information processing device such as a cellular phone terminal, a tablet PC (personal computer), a notebook PC, a PDA (Personal Digital Assistant), a desktop PC, or a workstation, instead of a multi-function cellular phone terminal.

In accordance with an accepted operation, the information processing device 20 outputs various instructions for controlling the sound output device 10 to the sound output device 10. The instruction output from the information processing device 20 to the sound output device 10 may be a command or other type of instruction. This allows the user to operate the sound output device 10 via the information processing device 20. In other words, the sound output device 10 can accept an operation from the information processing device 20.

Further, the information processing device 20 can output various types of sound information to the sound output device 10 in accordance with an accepted operation, and thus cause the sound output device 10 to output sound desired by the user. These various types of sound information include, but are not limited to, for example, information indicating music, sound, and the like associated with a moving image to be played in the information processing device 20, information indicating voice of a voice call performed using the information processing device 20, and the like.

Further, the information processing device 20 can also output a sound indicated by various types of sound information, from a speaker provided in the information processing device 20 in accordance with an accepted operation.

The information processing device 20 includes a control unit 21, a storage unit 22, an input accepting unit 23, a communication unit 24, a display unit 25, and a sound input/output unit 26.

The control unit 21 controls the entire information processing device 20. The control unit 21 is a processor, for example, a CPU. The control unit 21 executes various programs stored in the storage unit 22. Note that, the control unit 21 may be configured with a plurality of pieces of hardware, or may be configured with a single processor. Further, the control unit 21 may be hardware that is programmed to implement each function of the information processing device 20. In other words, the control unit 21 may have a configuration in which various programs stored in the storage unit 22 are mounted as hardware circuits. In this case, for example, the control unit 21 is configured with an ASIC, an FPGA, or the like.

The storage unit 22 includes, for example, an SSD, an EEPROM, a ROM, a RAM, and the like. Note that, the storage unit 22 may be an external type storage device coupled by a digital input/output port such as a USB, or the like, instead of a storage device built in the information processing device 20. The storage unit 22 stores various types of information, various programs, and the like processed by the information processing device 20. Note that, the storage unit 22 may be configured with a single storage device, or may be configured with a plurality of storage devices.

The input accepting unit 23 is, for example, a touch panel configured integrally with the display unit 25. Note that, the input accepting unit 23 may be, instead of the above, other input device separated from the display unit 25, such as a keyboard, or a mouse.

The communication unit 24 is configured to include, for example, a digital input/output port such as a USB, an Ethernet (registered trade mark) port, and the like.

The display unit 25 is, for example, a display device including a liquid crystal display panel, an organic EL display panel, or the like.

The sound input/output unit 26 is a function unit in which a sound input unit into which sound information is input, and a sound output unit that performs operation of outputting sound are integrally configured. For example, the sound input/output unit 26 includes a built-in microphone and a speaker configured integrally with the information processing device 20. In this case, the microphone is an example of the sound input unit. In addition, in this case, the speaker is an example of a sound output unit that performs operation of outputting sound. Note that, the speaker may be any type of speaker. Further, the information processing device 20 may be configured to include a built-in speaker configured integrally with the information processing device 20 as a sound output unit instead of the sound input/output unit 26.

Here, in the sound output system 1, when coupled to the information processing device 20, the sound output device 10 enables operation of the one or more first sound output units that are predetermined among the plurality of sound output units, and disables operation of the one or more sound output units other than the one or more first sound output units among the plurality of sound output units. In this example, as described above, the sound output device 10 includes the two sound input/output units of the sound input/output unit 16A and the sound input/output unit 16B, as these plurality of sound output units. Thus, in this example, when coupled to the information processing device 20, the sound output device 10 enables operation of one of the sound input/output unit 16A and the sound input/output unit 16B as operation of the first sound output unit that is predetermined, and disables operation of another of the sound input/output 16A and the sound input/output 16B. As a result, the sound output device 10, when coupled to the information processing device 20, can prevent an unintended sound input/output unit from outputting sound. Hereinafter, as an example, a case in which the sound input/output unit 16A is the predetermined first sound output unit will be described. Note that, a configuration may be adopted in which, when provided with three or more sound output units, and coupled to the information processing device 20, the sound output device 10 enables operation of one or more sound output units that are predetermined among the three or more sound output units as operation of one or more first sound output units, and disables operation of one or more sound output units of the three or more sound output units other than the one or more first sound output units. However, in this case, each of these one or more first sound output units does not inhibit operation of one another during operation.

Output of Sound in Sound Output System Hereinafter, output of sound in the sound output system 1 will be described with reference to FIG. 4. Here, in the description about FIG. 4, for convenience of explanation, output of sound information and output of sound will be collectively described as output of sound, so long as it is not necessary to distinguish these from each other. Further, hereinafter, for convenience of explanation, a state in which the sound output device 10 and the information processing device 20 are communicatively coupled is referred to as a coupled state. Further, hereinafter, for convenience of explanation, a state in which the sound output device 10 and the information processing device 20 are not communicatively coupled is referred to as an uncoupled state.

FIG. 4 is a diagram illustrating an example of a relationship between enabling or disabling operation of each of a sound input/output unit 16A and a sound input/output unit 16B, and the sound input/output unit that outputs sound in the sound output system 1.

As illustrated in FIG. 4, in the sound output system 1, the sound input/output unit that outputs sound is switched depending on whether operation of each of the sound input/output unit 16A and the sound input/output unit 16B is enabled or disabled.

Here, a case 1 illustrated in FIG. 4 illustrates a situation in which operation of both the sound input/output unit 16A and the sound input/output unit 16B is enabled, and a plug of an earphone or the like is plugged into the sound input/output unit 16B. Note that in FIG. 4, "Enable" indicates that operation is enabled. Also, in FIG. 4, "Disable" indicates that operation is disabled. In the sound output system 1 of the case 1, whether output of sound is performed by the sound input/output unit 16A or the sound input/output unit 16B is not determined. That is, in the sound output system 1 of the case 1, the sound input/output unit that outputs sound is not defined. In this case, output of sound is performed by either one or both of the sound input/output unit 16A and the sound input/output unit 16B. Thus, in the sound output system 1 of the case 1, output of sound may be performed by the sound input/output unit that is unintended. This is not desirable for the user of the sound output system 1. Note that, in FIG. 4, a state where a plug is plugged into the sound input/output unit 16B is indicated by "CONNECT". Further, in FIG. 4, a state where the plug is not plugged into the sound input/output unit 16B is indicated by "DISCONNECT".

Further, a case 2 illustrated in FIG. 4 illustrates a situation in which operation of both the sound input/output unit 16A and the sound input/output unit 16B is enabled, and a plug of an earphone or the like is not plugged into the sound input/output unit 16B. In the sound output system 1 of the case 2, output of sound is performed by the sound input/output unit 16A. This is because a plug of an earphone or the like is not plugged into the sound input/output unit 16B.

In addition, in the case 3 illustrated in FIG. 4, operation of the sound input/output unit 16A is enabled, operation of the sound input/output unit 16B is disabled, and a plug of an earphone or the like is plugged into the sound input/output unit 16B. In the sound output system 1 of the case 3, output of sound is performed by the sound input/output unit 16A.

In addition, in the case 4 illustrated in FIG. 4, operation of the sound input/output unit 16A is enabled, operation of the sound input/output unit 16B is disabled, and a plug of an earphone or the like is not plugged into the sound input/output unit 16B. In the sound output system 1 of the case 4 as well, output of sound is performed by the sound input/output unit 16A.

In addition, in the case 5 illustrated in FIG. 4, operation of the sound input/output unit 16A is disabled, operation of the sound input/output unit 16B is enabled, and a plug of an earphone or the like is plugged into the sound input/output unit 16B. In the sound output system 1 of the case 5, output of sound is performed by the sound input/output unit 16B.

In addition, in the case 6 illustrated in FIG. 4, operation of the sound input/output unit 16A is disabled, and operation of the sound input/output unit 16B is enabled, and a plug of an earphone or the like is not plugged into the sound input/output unit 16B. In the sound output system 1 of the case 6, output of sound is performed by the sound input/output unit 26 of the information processing device 20. This is because a plug of an earphone is not plugged into the sound input/output unit 16B.

Further, a case 7 illustrated in FIG. 4 illustrates a situation in which operation of both the sound input/output unit 16A and the sound input/output unit 16B is disabled, and a plug of an earphone is plugged into the sound input/output unit 16B. In the sound output system 1 of the case 7 as well, output of sound is performed by the sound input/output unit 26 of the information processing device 20.

Further, a case 8 illustrated in FIG. 4 illustrates a situation in which operation of both the sound input/output unit 16A and the sound input/output unit 16B is disabled, and a plug of an earphone or the like is not plugged into the sound input/output unit 16B. In the sound output system 1 of the case 8 as well, output of sound is performed by the sound input/output unit 26 of the information processing device 20.

As described above, in the sound output system 1, the sound input/output unit that outputs sound is switched depending on whether operation of each of the sound input/output unit 16A and the sound input/output unit 16B is enabled or disabled. Then, when the case 1 illustrated in FIG. 4 is realized, and the uncoupled state transitions to the coupled state, the sound output system 1 outputs sound from the sound input/output unit that is unintended in some cases. For example, when the case 1 is realized, and the uncoupled state transitions to the coupled state, the sound output system 1 outputs sound from both the sound input/output unit 16A and the sound input/output unit 16B.

Thus, in the sound output system 1, the sound output device 10 is configured not to realize the case 1. Specifically, as described above, when coupled to the information processing device 20, the sound output device 10 enables operation of the sound input/output unit 16A as operation of the first sound output unit that is predetermined, and disables operation of the sound input/output unit 16B. As a result, when coupled to the information processing device 20, the sound output device 10 can suppress the realization of the case 1, and as a result, can suppress output of sound from the sound input/output unit that is unintended.

Figure 5:
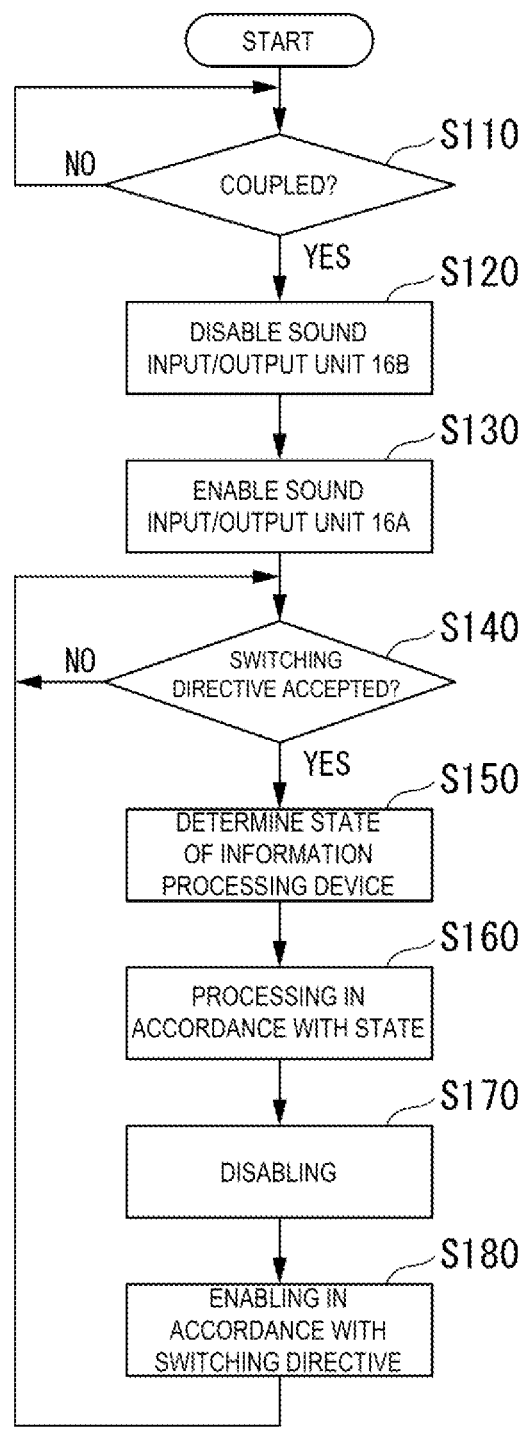
FIG. 5 is a diagram illustrating an example of a flow of enabling/disabling switching processing performed by the sound output device 10 when coupled to the information processing device 20.

Enabling/Disabling Switching Processing Performed by Sound Output Device when Coupled to Information Processing Device Hereinafter, enabling/disabling switching processing performed by the sound output device 10 when coupled to the information processing device 20 will be described with reference to FIG. 5. Here, the enabling/disabling switching processing is processing for switching between enabling and disabling operation of each of the sound input/output unit 16A and the sound input/output unit 16B, of processing performed by the sound output device 10. FIG. 5 is a diagram illustrating an example of a flow of enabling/disabling switching processing performed by the sound output device 10 when coupled to the information processing device 20. Hereinafter, as an example, a case will be described in which a power source of each of the sound output device 10 and the information processing device 20 is switched on, at timing before the processing in step S110 illustrated in FIG. 5 is performed. Further, hereinafter, as an example, a case will be described in which the sound output device main body 10A and the relay device 10B are communicatively coupled at the timing.

The control unit 11 waits until the sound output device 10 is coupled to the information processing device 20 (step S110). Note that, in FIG. 5, the processing in step S110 is indicated by "COUPLED?". When communication between the sound output device main body 10A and the information processing device 20 via wire or wirelessly via the relay device 10B is established, for example, the control unit 11 determines that the sound output device 10 is coupled to the information processing device 20. In other words, when communication between the sound output device 10 and the information processing device 20 is established, the control unit 11 determines that the sound output device 10 is coupled to the information processing device 20. On the other hand, for example, when this communication is not established, the control unit 11 determines that the sound output device 10 is not coupled to the information processing device 20. Here, the control unit 11 may have a configuration to determine that communication between the sound output device main body 10A and the information processing device 20 via wire or wirelessly via the relay device 10B is established, by using a known method, or may have a configuration to make a determination by using a method to be developed. Note that, the control unit 11 may be configured to determine that the sound output device 10 is coupled to the information processing device 20 by other methods. For example, the control unit 11 may be configured to determine that the sound output device 10 is coupled to the information processing device 20, when information indicating coupling completion output from the information processing device 20 is acquired. This information is an example of a second instruction. In addition, the control unit 11 may be configured to determine, when the sound output device 10 detects that the sound output device 10 is coupled to the information processing device 20, that the sound output device 10 is coupled to the information processing device 20. In this case, the sound output device 10 includes a detector that detects that the sound output device 10 is coupled to the information processing device 20.

When the control unit 11 determines that the sound output device 10 is coupled to the information processing device 20 (step S110—YES), the control unit 11 disables operation of the sound input/output unit 16B (step S120). In other words, the control unit 11 inhibits output of sound from the sound input/output unit 16B in step S120. In FIG. 5, the processing in step S120 is indicated by "DISABLE SOUND INPUT/OUTPUT UNIT 16B". Note that, the control unit 11 may perform the processing in step S120 by hardware such as stopping power supply to the sound input/output unit 16B by a switching element, or the like, or by software such as stopping output of sound information to the sound input/output unit 16B, or the like.

Next, the control unit 11, as operation of the predetermined first sound input/output unit, enables operation of the sound input/output unit 16A (step S130). In other words, the control unit 11 allows output of sound from the sound input/output unit 16A, in step S130. In FIG. 5, the processing in step S130 is indicated by "ENABLE SOUND INPUT/OUTPUT UNIT 16B". Note that, the control unit 11 may perform the processing in step S130 by hardware such as starting power supply to the sound input/output unit 16A by a switching element, or the like, or by software such as starting output of sound information to the sound input/output unit 16A, or the like. Furthermore, the control unit 11 may have a configuration in which the processing in step S120 and the processing in step S130 are performed in parallel.

Next, the control unit 11 waits until a switching instruction is accepted from the information processing device 20 (step S140). Here, the switching instruction is an instruction specifying one of the sound input/output unit 16A and the sound input/output unit 16B included in the sound output device 10. Additionally, the switching instruction is an instruction for enabling operation of the sound input/output unit specified by the switching instruction. For example, when the sound input/output unit specified by the switching instruction is the sound input/output unit 16B, the switching instruction is an instruction for enabling operation of the sound input/output unit 16B. Further, for example, when the sound input/output unit specified by the switching instruction is the sound input/output unit 16A, the switching instruction is an instruction enabling operation of the sound input/output unit 16A. Note that, when the sound output device 10 includes three or more sound input/output units, a switching instruction is an instruction for specifying any one of the three or more sound input/output units, and is an instruction for enabling operation of the sound input/output unit specified by the switching instruction.

When the control unit 11 determines that a switching instruction is accepted from the information processing device 20 (step S140—YES), the control unit 11 determines whether a state of the information processing device 20 is a voice call state, a sound input/output state, or a non-sound input/output state (step S150). In FIG. 5, the processing in step S150 is indicated by "DETERMINE STATE OF INFORMATION PROCESSING DEVICE". Here, the voice call state is a state in which a voice call is being made, among the states of the information processing device 20. The sound input/output state is a state different from the voice call state among the states of the information processing device 20, and is a state in which the information processing device 20 is performing input/output of sound other than a voice call. Note that, this input/output of sound also includes input/output of sound information. For example, the sound input/output state is a state in which the information processing device 20 is performing some or all of playback of a moving image accompanying output of sound, music playback, recording, and the like. The non-sound input/output state is a state different from both the voice call state and the sound input/output state. In other words, the non-sound input/output state is a state in which no voice call is made, and is a state in which no input/output of sound other than a voice call is performed, among the states of the information processing device 20.

Next, the control unit 11 performs processing in accordance with the state of the information processing device 20 determined in step S150 (step S160). In FIG. 5, the processing in step S160 is indicated by "PROCESSING IN ACCORDANCE WITH STATE". Here, the processing in step S160 will be described.

For example, when the state of the information processing device 20 determined in step S150 is the voice call state, the control unit 11 performs processing for muting volume of sound output from each of the sound input/output unit 16A and the sound input/output unit 16B as processing in accordance with the voice call state. This is because, when a voice call is made in the information processing device 20, and the sound output device 10 and the information processing device 20 are coupled, unless volume of sound output from each of the sound input/output unit 16A and the sound input/output unit 16B is muted, there is a possibility that the sound of the voice call in the information processing device 20 may be unintentionally output from either the sound input/output unit 16A and the sound input/output unit 16B. To prevent this, when the state of the information processing device 20 determined in step S150 is the voice call state, the control unit 11 performs processing for muting the volume of the sound output from each of the sound input/output unit 16A and the sound input/output unit 16B.

Further, for example, when the state of the information processing device 20 determined in step S150 is the sound input/output state, the control unit 11 performs processing for stopping input/output of sound by the information processing device 20 as processing in accordance with the sound input/output state. Specifically, when playback of music, a moving image, or the like, is performed by the information processing device 20, the control unit 11 performs processing for stopping the playback in step S160.

Further, when recording is performed by the information processing device 20, the control unit 11 performs processing for stopping the recording in step S160. This is because sound may be output from an unintended sound input/output unit, before the user enables operation of a desired sound input/output unit in the sound output device 10.

Further, for example, when the state of the information processing device 20 determined in step S150 is the non-sound input/output state, the control unit 11 does not perform processing in accordance with the non-sound input/output state in step S160.

After the processing in step S160 is performed, the control unit 11 disables operation of both the sound input/output unit 16A and the sound input/output unit 16B (step S170). In FIG. 5, the processing in step S170 is indicated by "DISABLING". Note that, when the sound output device 10 includes three or more sound input/output units, the control unit 11 disables operation of all of the three or more sound input/output units in step S170. The processing in step S170 is processing for more reliably suppressing unintentional realization of the above-described case 1, when enabling and disabling operation of each of the sound input/output unit 16A and the sound input/output unit 16B is switched.

For example, when the control unit 11 transitions the state from the case 3 to the case 5 by performing the processing in step S170 by the control unit 11, the control unit 11 transitions the state from the case 3 to the case 7, as illustrated in FIG. 6, and then transitions the state from the case 7 to the case 5. FIG. 6 is a diagram illustrating an example of an image of the states to transition through the processing of step S170. Here, the case 3 illustrated in FIG. 6 illustrates the case 3 illustrated in FIG. 4. In addition, the case 5 illustrated in FIG. 6 illustrates the case 5 illustrated in FIG. 4. In addition, the case 7 illustrated in FIG. 6 illustrates the case 7 illustrated in FIG. 4. That is, when the control unit 11 transitions a state in which the sound input/output unit that outputs sound is the sound input/output unit 16A to a state in which the sound input/output unit that outputs sound is the sound input/output unit 16B, the control unit 11, by the processing in step S170, transitions the state in which the sound input/output unit that outputs sound is the sound input/output unit 16A to a state in which the sound input/output unit that outputs sound is the sound input/output unit 26, and then transitions the state in which the sound input/output unit that outputs sound is the sound input/output unit 26 to the state in which the sound input/output unit that outputs sound is the sound input/output unit 16B. As a result, the sound output device 10 can more reliably prevents the case 1 from being unintentionally realized.

Next, the control unit 11 enables operation of the sound input/output unit specified by the switching instruction accepted in step S140 (step S180). In FIG. 5, the processing in step S180 is indicated by "ENABLING IN ACCORDANCE WITH SWITCHING DIRECTIVE". For example, when the sound input/output unit specified by the switching instruction accepted in step S140 is the sound input/output unit 16B, the control unit 11 enables operation of the sound input/output unit 16B. Further, for example, when the sound input/output unit specified by the switching instruction is the sound input/output unit 16A, the control unit 11 enables operation of the sound input/output unit 16A. This allows the user of the sound output device 10 to enable operation of a desired sound input/output unit, via the information processing device 20, after coupling the sound output device 10 to the information processing device 20. After the processing in step S180 is performed, the control unit 11 transitions to step S140, and waits again until a switching instruction is accepted from the information processing device 20.

As described above, when the sound output device 10 is coupled to the information processing device 20, the sound output device 10 enables operation of the sound input/output unit 16A of the two sound input/output units, as operation of the predetermined first sound input/output unit, and disables operation of the sound input/output unit 16B. As a result, the sound output device 10, when coupled to the information processing device 20, can prevent an unintended sound input/output unit from outputting sound.

In addition, when coupled to the information processing device 20, the sound output device 10 enables operation of the sound input/output unit 16A, and, after disabling operation of the sound input/output unit 16B, in accordance with an accepted switching instruction, enables operation of the sound input/output unit specified by the switching instruction. As a result, after the sound output device 10 is coupled to the information processing device 20, the sound output device 10 can switch the sound input/output unit that outputs sound to the sound input/output unit desired by the user, in accordance with an operation accepted from the user.

Further, when the sound output device 10 enables operation of any of the sound input/output unit 16A and the sound input/output unit 16B in accordance with a switching instruction, before enabling operation of the sound output unit, the sound output device 10 disables operation of both the sound input/output unit 16A and the sound input/output unit 16B, and then enables operation of the sound input/output unit. For example, as illustrated in FIG. 6, when the case 3 is switched to the case 5 in accordance with a switching instruction, the sound output device 10 switches from the case 3 to the case 7, and then switches from the case 7 to the case 5. An example of the processing for realizing this case 7 is the processing in step S170 illustrated in FIG. 5. As a result, when enabling and disabling of operation of each of the two sound input/output units is switched, the sound output device 10 can more reliably prevent the case 1 from being unintentionally realized.

Further, when the sound output device 10 enables operation of any of the sound input/output unit 16A and the sound input/output unit 16B in accordance with a switching instruction, before enabling operation of the sound output unit, the sound output device 10 performs processing in accordance with the state of the information processing device 20, disables operation of both the sound input/output unit 16A and the sound input/output unit 16B, and then enables operation of the sound input/output unit. As a result, the sound output device 10 can more reliably prevent both the sound input/output unit 16A and the sound input/output unit 16B from outputting unintentional sound.

Processing Performed by Information Processing Device when Switching Operation is Accepted Hereinafter, processing performed by the information processing device 20 when a switching operation is accepted will be described with reference to FIG. 7. Here, the switching operation is an operation that enables operation of one of the sound input/output unit 16A and the sound input/output unit 16B, and disables operation of another of the sound input/output unit 16A and the sound input/output unit 16B. FIG. 7 is a diagram illustrating an example of a flow of processing performed by the information processing device 20 when a switching operation is accepted. Hereinafter, as an example, a case will be described in which the processing in step S130 illustrated in FIG. 5 is performed at timing before processing in step S210 illustrated in FIG. 7 is performed. Further, hereinafter, as an example, a case will be described in which the operation image P1 including a region RA in which an image for accepting an operation to the sound output device 10 is displayed is displayed on the display unit 25 of the information processing device 20.

The control unit 21 waits until a switching operation is accepted (step S210). Here, the processing in step S210 will be described.

Figure 8:
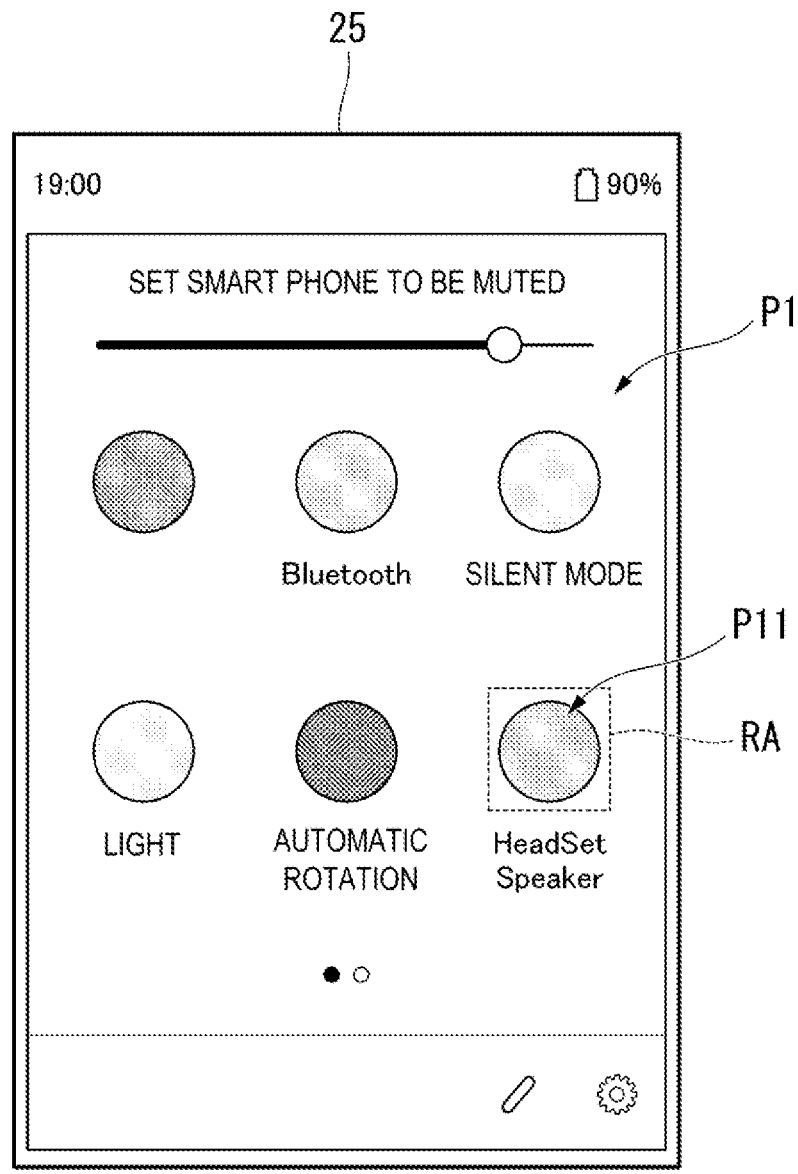
FIG. 8 is a diagram illustrating an example of an operation image P1.
Figure 9:
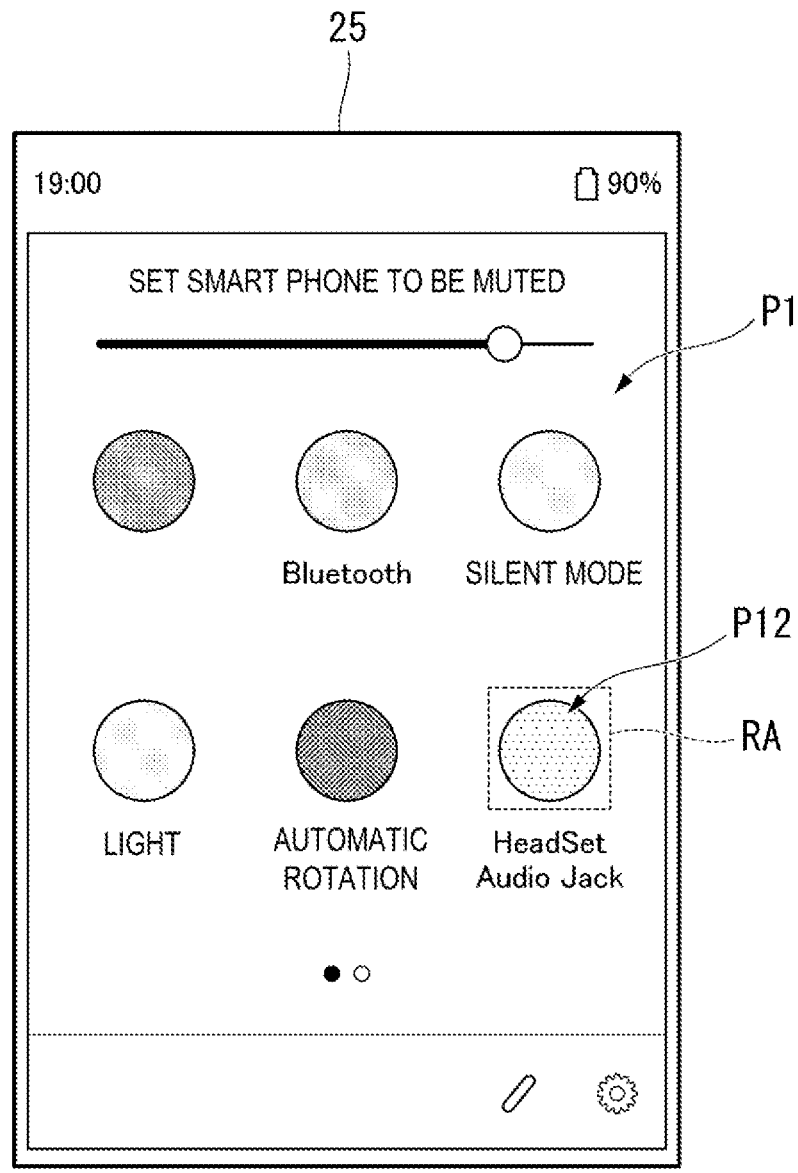
FIG. 9 is a diagram illustrating an example of the operation image P1 when an image P12 is displayed.

FIG. 8 is a diagram illustrating an example of the operation image P1. The operation image P1 includes the region RA. In the region RA, an image indicating a sound input/output unit for which operation is enabled is displayed in the current sound output device 10, as an example of an image for accepting an operation to the sound output device 10. In other words, immediately after the processing in step S130 illustrated in FIG. 5 is performed, an image P11 is displayed that indicates the sound input/output unit 16A being the first sound input/output unit in this example. When an operation of selecting the image P11 is performed, the control unit 21 accepts the operation as a switching operation that enables operation of the sound input/output unit 16B and disables operation of the sound input/output unit 16A. Then, the control unit 21 switches the image P11 to the image P12 indicating the sound input/output unit 16B, as illustrated in FIG. 9. In other words, in this case, the image P12 is displayed in the region RA, as illustrated in FIG. 9. FIG. 9 is a diagram illustrating an example of the operation image P1 when the image P12 is displayed. On the other hand, when an operation of selecting the image P12 is performed, the control unit 21 accepts the operation as a switching operation that enables operation of the sound input/output unit 16A and disables operation of the sound input/output unit 16B. Then, the control unit 21 switches the image P12 to the image P11 indicating the sound input/output unit 16A, as illustrated in FIG. 8. Note that, the operation of selecting each of the image P11 and the image P12 is, for example, a touch operation such as a tap, a click, or the like, but is not limited thereto.

When the control unit 21 determines that a switching operation is accepted (step S210—YES), the control unit 21 outputs a switching instruction to the sound output device 10 (step S220). Here, when the switching operation accepted by the control unit 21 is a switching operation for enabling operation of the sound input/output unit 16B, the control unit 21, in step S220, specifies the sound input/output unit 16B, and outputs a switching instruction for enabling operation of the sound input/output unit 16B to the sound output device 10. On the other hand, when the switching operation accepted by the control unit 21 is a switching operation for enabling operation of the sound input/output unit 16A, the control unit 21, in step S220, specifies the sound input/output unit 16A, and outputs a switching instruction for enabling operation of the sound input/output unit 16A to the sound output device 10.

Next, the control unit 21 switches the image displayed in the region RA (step S230). Here, when the switching operation accepted in step S210 is the operation of selecting the image P11, the control unit 21 switches the image P11 displayed in the region RA to the image P12, in step S230. On the other hand, when the switching operation accepted in step S210 is the operation of selecting the image P12, the control unit 21 switches the image P12 displayed in the region RA to the image P11, in step S230. After the processing in step S230 is performed, the control unit 21 transitions to step S210, and waits again until a switching operation is accepted.

As described above, the information processing device 20 can accept a switching operation to the sound output device 10. More specifically, the information processing device 20 can accept a switching operation, and, in accordance with the accepted switching operation, can enable operation of any of the sound input/output units included in the sound output device 10. In this way, the information processing device 20 can enable operation of the sound input/output unit that is desired by the user, of the sound input/output units included in the sound output device 10.

Processing Performed by Sound Output Device when Predetermined Storage Starting Condition is Satisfied Hereinafter, referring to FIG. 10, processing performed by the sound output device 10 when a predetermined storage starting condition is satisfied will be described. Here, the storage starting condition is a condition under which the sound output device 10 is caused to start storage of volume information indicating volume of sound. The storage starting conditions include, for example, five conditions from a condition A1 to a condition A5 described below.

(Condition A1): communication coupling between the sound output device 10 and the information processing device 20 is uncoupled (Condition A2): a power source of the information processing device 20 in a state of being coupled to the sound output device 10 is switched off (Condition A3): when operation of the sound input/output unit 16B is enabled, a plug is extracted from the jack of the sound input/output unit 16B (Condition A4): operation of the sound input/output unit 16A is switched from enabled to disabled (Condition A5): operation of the sound input/output unit 16B is switched from enabled to disabled Note that, the storage starting conditions may be configured to include other conditions instead of some or all of the five conditions from the conditions A1 to A5, or in addition to some or all of the five conditions. The control unit 11 determines that the storage starting condition is satisfied, for example, when at least one of the five conditions included in the storage starting conditions is satisfied. On the other hand, for example, when all of the five conditions included in the storage starting conditions are not satisfied, the control unit 11 determines that the storage starting condition is not satisfied.

Figure 10:
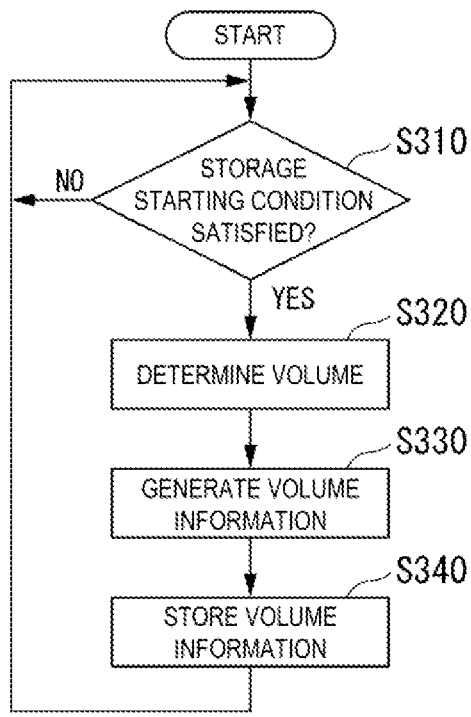
FIG. 10 is a diagram illustrating an example of a flow of processing performed by the sound output device 10 when a predetermined storage starting condition is satisfied.

FIG. 10 is a diagram illustrating an example of a flow of processing performed by the sound output device 10 when the predetermined storage starting conditions is satisfied.

The control unit 11 waits until the storage starting condition is satisfied (step S310).

When the control unit 11 determines that the storage starting condition is satisfied (step S310—YES), the control unit 11 determines the sound input/output unit for which operation is enabled between the sound input/output unit 16A and the sound input/output unit 16B. Then, the control unit 11 determines volume of sound output from the determined sound input/output unit (step S320). For example, when the control unit 11 determines that operation of the sound input/output unit 16A is enabled in step S320, the control unit 11 determines volume of sound output from the sound input/output unit 16A. Further, for example, when the control unit 11 determines that operation of the sound input/output unit 16B is enabled in step S320, the control unit 11 determines volume of sound output from a device having a plug plugged into the sound input/output unit 16B.

Next, the control unit 11 generates volume information (step S330). Here, when the sound input/output unit determined in step S320 is the sound input/output unit 16A, for example, the control unit 11 generates information including information indicating the volume determined in step S320, and information for identifying the sound input/output unit 16A, as volume information indicating the volume. Further, when the sound input/output unit determined in step S320 is the sound input/output unit 16B, for example, the control unit 11 generates information including information indicating the volume determined in step S320, and information for identifying the sound input/output unit 16B, as volume information indicating the volume.

Next, the control unit 11 causes the storage unit 12 to store the volume information generated in step S330 (step S340). Note that, when the control unit 11 causes the storage unit 12 to store the volume information including the information for identifying the sound input/output unit 16A, and the volume information is stored in advance in the storage unit 12, the control unit 11 updates the volume information to new volume information. Further, when the control unit 11 causes the storage unit 12 to store the volume information including the information for identifying the sound input/output unit 16B, and the volume information is stored in advance in the storage unit 12, the control unit 11 updates the volume information to new volume information. After the processing in step S340 is performed, the control unit 11 transitions to step S310, and waits again until the storage starting condition is satisfied.

As described above, the sound output device 10 can store volume information every time the predetermined storage starting condition is satisfied. Accordingly, the sound output device 10 can set volume of sound output from each of the sound input/output unit 16A and the sound input/output unit 16B to the same volume as the volume previously set by the user, without accepting an operation from the user, each time a reading starting condition described below is satisfied, by processing in a flowchart illustrated in FIG. 11.

Processing Performed by Sound Output Device when Predetermined Reading Starting Condition is Satisfied Hereinafter, referring to FIG. 11, processing performed by the sound output device 10 when a predetermined reading starting condition is satisfied will be described. Here, the reading starting condition is a condition under which the sound output device 10 is caused to start reading, from the storage unit 12, of volume information stored in advance in the storage unit 12. The reading starting conditions include, for example, the following five conditions from a condition B1 to a condition B5.

(Condition B1): the sound output device 10 is coupled to the information processing device 20
(Condition B2): a power source of the information processing device 20 in a state of being coupled to the sound output device 10 is switched on
(Condition B3): a plug is plugged into the jack of the sound input/output unit 16B when operation of the sound input/output unit 16B is enabled
(Condition B4): operation of the sound input/output unit 16A is switched from disabled to enabled
(Condition B5): operation of the sound input/output unit 16B is switched from disabled to enabled Note that, the reading starting conditions may be configured to include other conditions instead of some or all of the five conditions of the conditions B1 to B5, or in addition to some or all of the five conditions. The control unit 11 determines that the reading starting condition is satisfied, for example, when at least one of the five conditions included in the reading starting conditions is satisfied. On the other hand, for example, when all of the five conditions included in the reading starting conditions are not satisfied, the control unit 11 determines that the reading starting condition is not satisfied.

Figure 11:
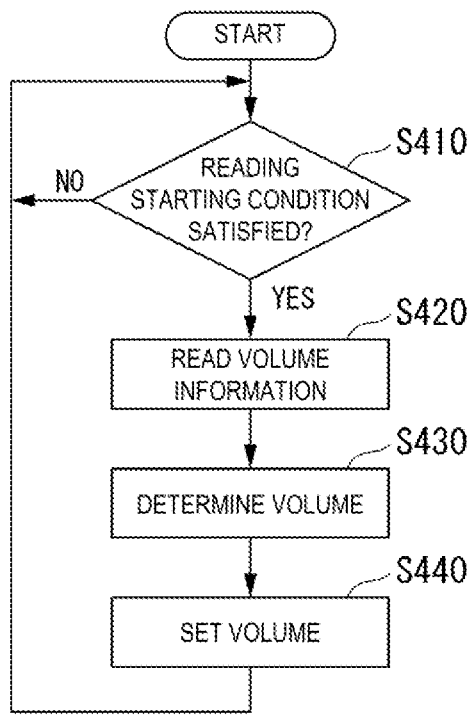
FIG. 11 is a diagram illustrating an example of a flow of processing performed by the sound output device 10 when a predetermined reading starting condition is satisfied.

FIG. 11 is a diagram illustrating an example of a flow of processing performed by the sound output device 10 when the predetermined reading starting condition is satisfied.

The control unit 11 waits until the reading starting condition is satisfied (step S410).

When the control unit 11 determines that the reading starting condition is satisfied (step S410—YES), the control unit 11 determines the sound input/output unit for which operation is enabled between the sound input/output unit 16A and the sound input/output unit 16B. Then, the control unit 11 reads, from the storage unit 12, volume information including information for identifying the determined sound input/output unit (step S420). For example, when the control unit 11 determines that operation of the sound input/output unit 16A is enabled in step S420, the control unit 11 reads volume information including the information for identifying the sound input/output unit 16A from the storage unit 12. Further, for example, when the control unit 11 determines that operation of the sound input/output unit 16B is enabled in step S320, the control unit 11 reads volume information including information for identifying the sound input/output unit 16B from the storage unit 12. Note that, in the storage unit 12 before the processing of the flowchart illustrated in FIG. 10 is performed, volume information including information indicating default volume may be stored as volume of sound output from the sound input/output unit 16A, along with the information for identifying the sound input/output unit 16A, or the volume information need not be stored. Further, in the storage unit 12 before the processing of the flowchart illustrated in FIG. 10 is performed, volume information including information indicating default volume may be stored as volume of sound output from the sound input/output unit 16B, along with the information for identifying the sound input/output unit 16B, or the volume information need not be stored.

Next, the control unit 11 determines volume indicated by the volume information read in step S420 (step S430).

Next, the control unit 11 sets volume of sound output from the sound input/output unit indicated by the information included in the volume information read in step S420, to the volume indicated by the information included in the volume information (step S440). Here, for example, when the sound input/output unit identified by the information included in the volume information read in step S420 is the sound input/output unit 16A, the control unit 11 sets volume of sound output from the sound input/output unit 16A to the volume determined in step S430. Further, for example, when the sound input/output unit identified by the information included in the volume information read in step S420 is the sound input/output unit 16B, the control unit 11 sets volume of sound output from the sound input/output unit 16B to the volume determined in step S430. After the processing in step S440 is performed, the control unit 11 transitions to step S410, and waits again until the reading starting condition is satisfied.

As described above, the sound output device 10 can set volume of sound output from each of the sound input/output unit 16A and the sound input/output unit 16B to the same volume as the volume previously set by the user, without accepting an operation from the user, each time the predetermined reading starting condition is satisfied.

As described above, the sound output device according to the exemplary embodiment is the sound output device communicatively coupled to the information processing device, that includes the mounting portion configured to mount the sound output device on a human body, the plurality of sound output units configured to perform operation for outputting information indicating sound, or sound, and the control unit configured to, when the sound output device is coupled to the information processing device, enable operation of one or more first sound output units that are predetermined among the plurality of sound output units, and disable operation of one or more sound output units other than the one or more first sound output units among the plurality of sound output units. As a result, the sound output device, when coupled to the information processing device, can prevent an unintended sound input/output unit from outputting sound. Here, in the example described above, the sound output device 10 is an example of the sound output device. In addition, in the example described above, the information processing device 20 is an example of the information processing device. In addition, in the example described above, the mounting portion 17 is an example of the mounting portion. In addition, in the example described above, each of the sound input/output unit 16A and the sound input/output unit 16B is an example of the sound output unit. In addition, in the example described above, the sound input/output unit 16A is an example of the first sound output unit. In addition, in the example described above, the control unit 11 is an example of the control unit.

Further, a configuration may be used in a sound output device in which, when coupled to an information processing device, a control unit enables operation of one or more first sound output units, and, after disabling operation of one or more sound output units, in accordance with an accepted first instruction, enables operation of a second sound output unit specified by a first instruction, among a plurality of sound output units. Here, in the example described above, the switching instruction is an example of the first instruction. In addition, in the example described above, each of the sound input/output unit 16A and the sound input/output unit 16B is an example of the second sound output unit.

Further, a configuration may be used in a sound output device in which, when a control unit enables operation of a second sound output unit in accordance with a first instruction, before enabling operation of the second sound output unit, the control unit disables operation of all of a plurality of sound output units, and thereafter enables operation of the second sound output unit.

Further, a configuration may be used in a sound output device in which, when a control unit enables operation of a second sound output unit in accordance with a first instruction, before enabling operation of the second sound output unit, the control unit performs processing in accordance with a state of an information processing device, disables operation of all of a plurality of sound output units, and thereafter enables operation of the second sound output unit.

Additionally, a configuration may be used in a sound output device in which, some or all of a plurality of sound output units are sound input/output units configured integrally with a sound input unit into which information indicating sound is input.

Further, a configuration may be used in a sound output device in which, when a control unit is coupled to an information processing device, the control unit enables operation of one or more first sound output units in accordance with a second instruction accepted from the information processing device, and disables operation of one or more sound output units.

Further, a configuration may be used in a sound output device that includes a detector configured to detect that an information processing device is coupled, and when the detector detects coupling to the information processing device, a control unit enables operation of one or more first sound output units and disables operation of one or more sound output units.

Additionally, a configuration may be used in a sound output device in which, a plurality of sound output units include a device that has a jack, and when a plug is plugged into the jack, performs operation of outputting information indicating sound to the plug, and a speaker that outputs sound.

Additionally, a configuration may be used in which, a sound output device is a wearable display device that further includes a display unit displaying an image. Here, in the example described above, the wearable display device is a head-mounted display.

The exemplary embodiment of the present disclosure has been described in detail above with reference to the figures, but specific configurations are not limited to this exemplary embodiment, and changes, substitutions, and deletions may be made without departing from the spirit of the present disclosure.

Furthermore, a program for realizing functions of any of components in the device described above may be recorded on a computer readable recording medium, and the program may be read into a computer system and executed. The device is, for example, the sound output device 10, the sound output device main body 10A, the relay device 10B, the information processing device 20, or the like. Note that, the "computer system" here includes an Operating System (OS) and hardware such as peripheral devices. Furthermore, the "computer readable recording medium" refers to a portable medium such as a flexible disk, a magneto-optical disk, a ROM, or a CD (Compact Disk)-ROM, and a storage device such as a hard disk built into the computer system. Furthermore, the "computer readable recording medium" includes a medium that holds a program for a certain period of time, such as a volatile memory (RAM) within a computer system that serves as a server or a client when a program is transmitted over a network such as the Internet or a communication line such as a telephone line.

Further, the above program may be transmitted from a computer system that stores the program in a storage device or the like, to another computer system via a transmission medium, or by transmitted waves in a transmission medium. Here, the "transmission medium" for transmitting a program refers to a medium having a function of transmitting information such as a network (communication network) such as the Internet or a communication line (communication wire) such as a telephone line.

Furthermore, the program described above may be configured to realize some of the functions described above. Furthermore, the program described above may be a program that can realize the above-described functions in combination with a program already recorded in a computer system, that is, a so-called differential file (differential program).

What is claimed is:

1. A sound output device communicably coupled to an information processing device having a built-in processor via wire or wirelessly, the sound output device being a different and separate entity from the information processing device and comprising:
 a display unit including a display element for emitting imaging light;
 a mounting portion configured to mount the display unit on a human body;
 a first sound output unit configured to output sound or information indicating the sound, wherein the first sound output unit is a speaker built-in the sound output device for outputting the sound;

a second sound output unit different from the first sound output unit, and configured to output the information indicating the sound, wherein the second sound output unit is a device having a jack that is configured to, when a plug of an earphone or a headphone is plugged into the jack, output the information indicating the sound to the earphone or the headphone; and a control unit comprising a processor or a hardware integrated inside the sound output device, wherein the control unit determines (i) whether the sound output device is coupled to the information processing device, (ii) whether the plug of the earphone or the headphone is plugged into the jack, and (iii) whether a state of the information processing device is a voice call state, and controls operation of the first output sound unit and operation of the second output sound unit, wherein when the control unit determines that the sound output device is coupled to the information processing device, the control unit enables the operation of the first sound output unit in accordance with a first control instruction accepted from the information processing device after disabling the operation of the second sound output unit, the first control instruction being information indicating coupling completion output from the information processing device, wherein when the control unit determines that the sound output device is coupled to the information processing device and the plug of the earphone or the headphone is plugged into the jack, the control unit enables the operation of the second sound output unit after disabling the operation of the first sound output unit, wherein when the control unit determines that the sound output device is coupled to the information processing device and the information processing device is the voice call state, the control unit disables the operation of the first sound output unit and the operation of the second sound output unit, and wherein the control unit determines a volume of the sound output from the first sound output unit when the first sound output unit is enabled, and the control unit generates a volume information that includes the determined volume of the sound and information identifying the first sound output unit.

2. The sound output device according to claim 1, wherein the control unit, in accordance with a second control instruction accepted from the information processing device, enables the operation of the second sound output unit, and disables the operation of the first sound output unit.

3. The sound output device according to claim 2, wherein the control unit, after disabling the operation of the first sound output unit, enables the operation of the second sound output unit.

4. The sound output device according to claim 3, wherein the control unit, after performing processing in accordance with the state of the information processing device and disabling the operation of the first sound output unit, enables the operation of the second sound output unit.

5. The sound output device according to claim 1, wherein the first sound output unit and the second sound output unit are sound input/output units into which information indicating sound is input.

6. The sound output device according to claim 1, comprising:

a detector configured to detect that the information processing device is coupled.

7. A sound output system, comprising:

an information processing device having a built-in processor; and a sound output device communicably coupled to the information processing device via wire or wirelessly, the sound output device being a different and separate entity from the information processing device and including a first sound output unit configured to output sound or information indicating the sound, wherein the first sound output unit is a speaker built-in the sound output device for outputting the sound, a second sound output unit that is different from the first sound output unit, and outputs the information indicating the sound, wherein the second sound output unit is a device having a jack that is configured to, when a plug of an earphone or a headphone is plugged into the jack, output the information indicating the sound to the earphone or the headphone, and a control unit that comprises a processor or a hardware integrated inside the sound output device, wherein the control unit determines (i) whether the sound output device is coupled to the information processing device, (ii) whether the plug of the earphone or the headphone is plugged into the jack, and (iii) whether a state of the information processing device is a voice call state, and controls operation of the first output sound unit and operation of the second output sound unit, wherein when the control unit determines that the sound output device is coupled to the information processing device, the control unit enables the operation of the first sound output unit in accordance with a first control instruction accepted from the information processing device after disabling the operation of the second sound output unit, the first control instruction being information indicating coupling completion output from the information processing device, wherein when the control unit determines that the sound output device is coupled to the information processing device and the plug of the earphone or the headphone is plugged into the jack, the control unit enables the operation of the second sound output unit after disabling the operation of the first sound output unit, wherein when the control unit determines that the sound output device is coupled to the information processing device and the information processing device is the voice call state, the control unit disables the operation of the first sound output unit and the operation of the second sound output unit, and wherein the control unit determines a volume of the sound output from the first sound output unit when the first sound output unit is enabled, and the control unit generates a volume information that includes the determined volume of the sound and information identifying the first sound output unit.

8. A control method of a sound output device, wherein the sound output unit comprises a first sound output unit being a speaker configured to output sound, and a second sound output unit being a device having a jack that is configured to, when a plug of an earphone or a headphone is plugged into the jack, output information indicating the sound to the earphone or the headphone, the control method comprising:

detecting (i) whether the sound output device is communicably coupled to an information processing device having a built-in processor via wire or wirelessly, (ii) whether the plug of the earphone or the headphone is plugged into the jack, and (iii) whether a state of the information processing device is a voice call state, so as to control operation of the first output sound unit and operation of the second output sound unit, wherein the sound output device is a different and separate entity from the information processing device;

when detected that the sound output device is coupled to the information processing device, enabling the operation of the first sound output unit in accordance with a first control instruction accepted from the information processing device after disabling the operation of the second sound output unit, the first control instruction being information indicating coupling completion output from the information processing device;

when detected that the sound output device is coupled to the information processing device and the plug of the earphone or the headphone is plugged into the jack, enabling the operation of the second sound output unit after disabling the operation of the first sound output unit;

when detected that the sound output device is coupled to the information processing device and the information processing device is the voice call state, disabling the operation of the first sound output unit and the operation of the second sound output unit;

determining a volume of the sound output from the first sound output unit when the first sound output unit is enabled; and generating a volume information that includes the determined volume of the sound and information identifying the first sound output unit.

\* \* \* \* \*